Patented Nov. 13, 1945

2,388,851

UNITED STATES PATENT OFFICE 2,388,851

SOLUBLE MATERIAL WHICH BECOMES INSOLUBLE UPON SEPARATION FROM SOLVENT

William O. Kenyon and William F. Fowler, Jr., Rochester, N. Y., assignors to Eastman Kodak Company, Rochester, N. Y., a corporation of New Jersey No Drawing. Application May 11, 1942, Serial No. 442,452

11 Claims. (Cl. 260—86)

This invention relates to soluble synthetic polymeric materials which become insoluble upon separation from the solvent of a solution of the material.

Soluble materials which become insoluble upon separation of the material from the solvent are known in nature. Thus, silkworms and spiders secrete a material which when spun by the insects gives insoluble, strong, flexible threads after drying in the air. Many materials of botanical origin, such as linseed oil, are capable of hardening and becoming insoluble upon absorption of oxygen from the air. Some synthetic materials embodying unsaturated radicals, such as the unsaturated radicals of linseed oil, are likewise capable of hardening upon absorption of oxygen from the air.

Synthetically a number of materials have been prepared which can be made to pass from a soluble to an insoluble, infusible state, but rather drastic conditions are required. For example, heating with alkaline or acid catalysts is used to insolubilize the soluble condensates of phenol or urea with formaldehyde. Baking at elevated temperatures is used to insolubilize the polyhydric alcohol-polybasic acid resins.

We have now succeeded in producing soluble synthetic polymeric materials which become insoluble upon separation of the material from the solvent of a solution of the materials. A preferred form of our materials is water-soluble and upon separation from the water of an aqueous solution, becomes water-insoluble. When a water solution of these water-soluble materials is coated on a film-forming surface and the coating permitted to dry, an insoluble, tough, rubbery, transparent sheet obtains.

It is accordingly an object of our invention to provide soluble synthetic polymeric materials which become insoluble upon separation of the material from the solvent of a solution of the materials. A further object is to provide a process for preparing such materials. A still further object is to provide articles fabricated with our materials. Other objects will become apparent hereinafter.

In accordance with our invention, we have provided soluble synthetic polymeric materials which when separated from the solvent of a solution of the material becomes insoluble in the solvent. Our new soluble synthetic materials contain linear polymeric chains which probably become cross-linked upon separation from the solvent. A preferred form of our new soluble synthetic materials contain linear polymeric carbon chains, e. g. a polyvinyl chain.

In accordance with our invention, we prepare our soluble materials by deesterifying a copolymer of an unsaturated compound of the following general formula:

I. 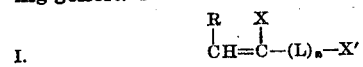

(wherein L represents a divalent carbon radical, $n$ represents a positive integer, R represents hydrogen or an aliphatic group, and X and X' each represents the same or different deesterifiable groups) and any other different unsaturated compound, i. e. any other compound containing the

group. A preferred form of our materials which are water-soluble are prepared by deesterifying a copolymer of an unsaturated compound of Formula I with an unsaturated compound of the following general formula:

II. 

wherein R represents a non-deesterifiable group and X represents a deesterifiable group.

As unsaturated compounds of general Formula I the following are exemplary: carboxylic esters of β-halogeno-allyl alcohols, e. g. β-chloro-allyl acetate, β-chloro-allyl carbamate, β-chloro-allyl methyl carbonate, and carboxylic esters of β-halogeno-crotonyl alcohols. As unsaturated compounds to copolymerize with the unsaturated compounds of Formula I, the following are exemplary: vinyl chloride, vinyl ethyl ether, styrene, methyl acrylate, acrylic acid, α-substituted acrylic acids, methyl methacrylate, acrylonitrile, vinyl carboxylic esters (e. g. vinyl acetate, vinyl carbamates and vinyl alkyl carbonates). Of these latter unsaturated compounds, the vinyl carboxylic esters come under Formula II.

The ratio of unsaturated compounds of Formula I to the other unsaturated compounds can be any desired ratio. Generally speaking the amount of unsaturated compound of Formula I which can be introduced into the copolymer is limited by the nature of the copolymerizing materials, the copolymerizations proceeding to give copolymers containing a minority of units corresponding to compounds of Formula I.

A group of our new materials which are water-soluble and which give rise to highly useful insoluble materials can be obtained from copolymers involving from about 1 to about 14 percent of an unsaturated compound of Formula I and the remainder of an unsaturated compound of Formula II. Such water-soluble materials are useful as impregnating agents, since when a substance is impregnated with a water solution of the materials and the water allowed to evaporate, an impregnation is obtained which is insoluble in water and organic solvents. Thus, these water-soluble materials are useful as sizing agents for paper, textiles or cotton thread. Water solutions of these water-soluble materials can be cast in the form of sheet or filaments into drying media. The resulting water-insoluble filaments can be spun into threads. Such threads bear a certain resemblance to cotton threads in that they contain hydroxyl groups but possess water-insolubility. Such threads or sheets can be esterified, etherified or acetalized.

Our new water-soluble materials give insoluble materials which are extremely resistant to organic solvents and hence are useful in the manufacture of surgical gloves, tubes for carrying gasoline, oils, etc., for sheeting, coatings and the like.

Deesterification of the copolymers of all types is advantageously carried out in an acid medium. Advantageously deesterfiication is effected with an alcoholic deesterifying agent and a deesterification catalyst. Alcohols such as methanol, ethanol and the propanols are advantageously used. Any of the known acid deesterification catalysts are suitable, although hydrogen chloride appears to be especially efficacious. The deesterification is advantageously carried out at moderate temperatures, i. e. under 50° C.

The following examples will serve to illustrate our new materials and the manner of preparing the same.

*Example 1.—Deesterification of the copolymer of vinyl acetate and β-chloroallyl acetate*

100 g. of a copolymer of vinyl acetate and β-chloroallyl acetate containing 3.18 percent by weight of the latter, were dissolved in 900 cc. of anhydrous methanol. To the resulting solution were added dropwise with stirring, 50 cc. of 3.36 N solution of hydrogen chloride in dry methanol. The resulting mixture was allowed to stand at about 25° C. for about 15 hours. At the end of this time the mixture had set to a rigid gel. The gel was cut into thin slices and the slices washed with cold water. At the end of the washing the slices were transparent. The excess water was decanted from the slices and the slices were heated in a flask at 65° C. until an almost transparent solution was obtained. Analysis of the solution showed that it contained about 7.56 percent by weight of solids.

The solution was coated on a glass plate. The resulting coating was permitted to dry in the air for about 15 hours at about 25° C. At the end of this time, the coating was insoluble in boiling water. The coating remained clear, brilliant and insoluble when maintained in boiling water for several minutes.

A small sample of the solution was poured into methanol and the precipitated solid was dried at 50° C. Upon analysis only a trace of chlorine could be detected.

*Example 2.—Deesterification of the copolymer of vinyl acetate and β-chloroallyl acetate*

10 cc. of concentrated sulfuric acid (sp. g. 1.84) were dissolved in 50 cc. of cool methanol. The resulting mixture was added slowly with stirring to 500 g. of a 20 percent methanol solution of a copolymer of vinyl acetate and β-chloroallyl acetate, containing 3.1 percent of the latter. The resultant mixture was permitted to stand for 16 hours at about 25° C. The gel which formed, and had undergone slight syneresis, was sliced and washed in running cold water for eight hours. The gel slices were then melted by subjecting them to a temperature of 60° C. for about one-half hour. The resultant solution was cooled to about 25° C. and the pH (initially 2.5) was adjusted to 6.15 by cautious addition of 28 percent aqueous ammonia. The resulting solution was coated on a glass plate as in Example 1. Insoluble, clear, brilliant coatings were obtained. Physical measurements made on the coatings (0.005 inch thick) after further drying (curing) for 16 hours at 65° C. were as follows:

Breaking load=25 kg.
Elongation=6%
Folds before breaking=24
Tear strength=32

After curing at 105° C. for 16 hours:

Breaking load=29 kg.
Elongation=6%
Folds before breaking=15
Tear strength=30

*Example 3.—Deesterification of the copolymer of vinyl acetate and β-chloroallyl acetate*

500 g. of a 20 percent methanol solution of a copolymer of vinyl acetate and β-chloroallyl acetate, containing 3.1 percent of the latter, were heated on a steam bath with stirring. When the solution commenced to boil, 400 cc. of 2 N aqueous hydrochloric acid were added dropwise to the boiling solution with stirring. The heating and stirring were continued until a large part of the methanol had been distilled off. The resulting solution was cooled and rendered slightly alkaline to litmus, using 28 percent aqueous ammonia. The resulting solution was then coated as in Example 1, and the coating allowed to dry at about 25° C. The resulting coatings containing ammonium chloride, were washed in running cold water for seven hours. The washed skins were then dried for 15 hours at about 25° C. and then further dried at 50° C. for about 16 hours. Physical measurements on the cured coating (0.005 inch thick) yielded the following results:

Breaking load=23.6 g.
Elongation=9.0%
Tear strength=64
Folds before breaking=98 (on coating 0.004 inches thick)

*Example 4.—Deesterification of the copolymer of vinyl acetate and β-chloroallyl N-ethyl carbamate*

To 1 liter of a 10 percent solution (by weight) of a copolymer of vinyl acetate and β-chloroallyl N-ethyl carbamate containing 6.8 percent by weight of the latter, were added dropwise with stirring 50 cc. of a 3.5 N solution of hydrogen chloride in methanol. The resulting mixture was allowed to stand at about 25° C. for 20 hours. At the end of this time the mixture had set to a gel. The gel was cut into thin slices and washed in running cold (3° C.) water for 4 hours. The washed gel was then melted by heating at 60° C. for ½ hour. The resulting solution was coated on glass plates and the coating permitted to dry for about 12 hours, at about 25° C. The dried coating was insoluble in boiling water.

*Example 5.—Deesterification of the copolymer of vinyl acetate and β-chloroallyl benzoate*

To 1 liter of a 10 percent solution (by weight) of a copolymer of vinyl acetate and β-chloroallyl benzoate, containing 8 percent by weight of the latter, were added dropwise with stirring 50 cc. of a 3.5 N solution of hydrogen chloride in methanol. The resulting mixture was allowed to stand at about 25° C. for 20 hours. At the end of this time, the mixture had set to a gel. The gel was cut into thin slices and washed in running cold (3° C.) water for 4 hours. The washed gel was then melted by heating at 60° C. for ½ hour. The resulting solution was coated on glass plates and the coating permitted to dry for about 12 hours at about 25° C. The dried coating was insoluble in boiling water.

*Example 6.—Deesterification of the copolymer of vinyl acetate and β-chloroallyl ethyl carbonate*

To 1 liter of a 10 percent solution (by weight) of a copolymer of vinyl acetate and β-chloroallyl ethyl carbonate, containing about 9.2 percent by weight of the latter, were added dropwise with stirring 50 cc. of a 3.5 N solution of hydrogen chloride. The resulting mixture was allowed to stand at about 25° C. for 20 hours. At the end of this time the mixture had set to a gel. The gel was cut into thin slices and washed in running cold (3° C.) water for 4 hours. The washed gel was then melted by heating at 60° C. for ½ hour. The resulting solution was coated on glass plates and the coating permitted to dry for about 12 hours, at about 25° C. The dried coating was insoluble in boiling water.

The copolymers of vinyl aliphatic carboxylic esters and β-halogenoallyl carboxylic esters which we employ in practicing our invention can be prepared by copolymerizing a mixture of a vinyl carboxylic ester and a β-halogenoallyl carboxylic ester, using an organic peroxide as a catalyst (see the copending application of W. O. Kenyon and J. H. Van Campen, Serial No. 442,454, filed of even date herewith.) The copolymers of β-halogenoallyl carboxylic esters with polymerizable organic compounds containing an ethylenic linkage conjugated with another double bond linkage, such as methyl acrylate and methyl methacrylate can be similarly prepared (see the copending application of W. O. Kenyon and J. H. Van Campen, Serial No. 442,453, filed of even date herewith). Still other copolymers employed in the above examples can be prepared as illustrated in the following examples.

*Example 7.—Copolymerization of vinyl acetate and β-chloroallyl N-ethyl carbamate*

190 g. of vinyl acetate and 10 g. of β-chloroallyl N-ethyl carbamate were placed in a tightly stoppered brown bottle together with 0.2 g. of benzoyl peroxide dissolved in thiophene-free benzene, and the bottle was allowed to stand in a constant temperature bath at 50° C. for 72 hours. The resulting resin was dissolved in acetone and the acetone solution poured into cold water to precipitate the resin. The precipitated resin was dried for 72 hours at 50° C. The resin was found to contain 0.84 percent by weight of chlorine.

*Example 8.—Copolymerization of vinyl acetate and β-chloroallyl benzoate*

190 g. of vinyl acetate and 10 g. of β-chloroallyl benzoate were placed in a tightly stoppered brown bottle and the bottle was allowed to stand in a constant temperature bath at 50° C. for 72 hours. The resulting resin was dissolved in acetone and the acetone solution poured into cold water to precipitate the resin. The precipitated resin was dried for 72 hours at 50° C. The resin was found to contain 1.45 percent by weight of chlorine.

*Example 9.—Copolymerization of vinyl acetate and β-chloroallyl ethyl carbonate*

190 g. of vinyl acetate and 10 g. of β-chloroallyl ethyl carbonate were placed in a tightly stoppered brown bottle and the bottle was allowed to stand in a constant temperature bath at 50° C. for 72 hours. The resulting resin was dissolved in acetone and the acetone solution poured into cold water to precipitate the resin. The precipitated resin was dried for 72 hours at 50° C. The resin was found to contain 1.98 percent by weight of chlorine.

The β-chloroallyl N-ethyl carbamate employed in the above example was prepared as follows:

In a 250 cc. round-bottom flask with a ground joint attached to a reflux condenser were placed 50 g. (0.5 mole) of β-chloroallyl alcohol, freshly distilled, and 40 g. of ethyl isocyanate (62A-C46), and 50 cc. of dry pyridine. The flask was heated in a constant temperature bath for 32 hours at 50° C. Then the reaction mixture was washed with 500 cc. of hot water at 60° C. The oil was separated and taken up in 300 cc. of ether and dried over anhydrous magnesium sulfate (100 g.) and activated charcoal (10 g.) and allowed to remain in contact with these two compounds for 63 hours. The ether solution was then filtered and, after recovery of the ether at normal pressure on a gently heated steam bath, the crude product weighed 96 g. This crude product was vacuum distilled and the fraction boiling between 106° C. and 108° C. at 8 mm. of Hg pressure was collected separately. The weight of this main fraction was 44 g. or about 50 percent of the theoretical value. Analysis for nitrogen showed 8.19 percent; calculated value 8.51 percent.

The β-chloroallyl benzoate employed in the above example was prepared as follows:

185 g. (2 moles) of β-chloroallyl alcohol, freshly distilled, were united at room temperature with 250 g. of anhydrous pyridine. A 3-necked flask, placed on the steam bath, was used, provided with a sealed stirrer, reflux condenser, and a thermometer (to measure liquid temperature). In small portions with stirring (30 to 40 cc. at a time) 280 g. (2 moles) of benzoyl chloride were added to this mixture. During the addition of the benzoyl chloride, the exothermic reaction produced a steady rise in temperature up to 130.5° C. After all of the benzoyl chloride has been added, the temperature soon dropped to 80° C. when steam was turned on to heat the reaction mixture at between 95° C. and 98° C. After 18 hours' stirring and heating the reaction appeared to be complete.

The reaction mixture, while hot, was poured carefully and slowly, under stirring, into 1500 cc. of water at 50° C.

The reaction product was separated from the aqueous portion and washed twice; first, with one liter of 10 percent sodium bicarbonate, then with water at 30° C. The oil was separated from the wash water and taken up with 500 cc. of ether. The ether extract was dried for 24 hours over anhydrous magnesium sulfate, shaking occasionally.

The solution was filtered twice and the ether expelled at normal pressure, and the pyridine removed under vacuum of 72 mm. of mercury at about 70° C. Higher vacuum was then applied (10 mm.) and the fraction boiling at 132° C. to 133° C. was collected separately, representing a colorless, viscous liquid. The yield was 278 g. or 70 percent of theory. Analysis showed 18 percent of chlorine, while the calculated value is 18.30 percent.

The β-chloroallyl ethyl carbonate employed in the above example was prepared as follows:

Into a 3-liter, 3-necked flask provided with stirrer, reflux condenser, and dropping funnel, were placed 200 g. of dry pyridine, 185 g. (2 moles) of dry β-chloroallyl alcohol (freshly distilled) and 500 cc. of dry benzene. To this was then added dropwise 218 g. (2 moles) of ethyl chlorocarbonate. This operation required one hour, when the steam was turned on and the mixture refluxed for three hours. The reaction mixture was then cooled to 5° C., filtered, and the residue on the filter washed with 100 cc. of chilled dry pyridine (10° C.). The filtrate was then dried over anhydrous magnesium sulfate (125 g.) for 24 hours, when the pyridine was distilled off at 16 mm. pressure with a boiling point of 40° C. to 47° C. The residual liquid was deeply colored and, to remove impurities, was treated with 15 g. of activated charcoal. After warming on the steam bath for 2 hours, the charcoal was removed by filtration, and the filtrate distilled through a Vigareaux column at 14 mm. of Hg. pressure, boiling at 73° C. to 75° C. 115 g. of material was thus obtained; this represents a yield of 28.6 percent of the substance suitable for copolymerization. Analysis for chlorine showed 21.80 percent, while the calculated value is 21.59 percent.

The insoluble resinous materials obtained by removal of the solvent from our new soluble materials can be further treated with agents capable of reacting with hydroxyl groups, e. g. with aldehydes to acetalize the hydroxyl groups, with organic isocyanates to carbamylate the hydroxyl groups, with carboxylic halides or carboxylic anhydrides to esterify the hydroxyl groups or with etherifying agents. The following examples will serve to illustrate this further treatment.

*Example 10.—Acetalization with n-butyraldehyde*

An insoluble coating such as that described in Example 1, weighing 2 g. was placed in a 2-liter, round-bottom flask, containing 1 liter of water, 50 cc. of concentrated hydrochloric acid and 13 g. of n-butyraldehyde. The flask was stoppered and the mixture shaken mechanically for 16 hours. The sheet which was removed from the mixture was clear. It was swollen in absolute ethyl alcohol and then was soaked for an hour in 28 percent ammonia. The sheet was then washed in running hot water for several hours. Upon drying a sheet which was impermeable to water was obtained.

*Example 11.—Acetalization with acetaldehyde*

An insoluble coating such as that described in Example 1, weighing 1.5 g., was placed in a 2-liter, round-bottom flask containing 1 liter of water, 50 cc. of concentrated hydrochloric acid and 10 g. of acetaldehyde. The flask was stoppered and the mixture shaken for 16 hours mechanically. The sheet which was removed from the mixture was clear. It was swollen in absolute ethyl alcohol and then washed by soaking for 1 hour in 28 percent aqueous ammonia. The coating was then washed in running hot water for several hours. Upon drying a coating impermeable to water was obtained.

*Example 12.—Carbamylation with phenyl isocyanate*

A small coating such as that described in Example 1 was placed in a mixture containing 75 cc. of anhydrous pyridine and 10 cc. of phenyl isocyanate. This mixture was heated on the steam bath for 2 hours, the mixture being protected from the atmosphere by means of anhydrous calcium chloride. After 15 minutes' heating the sheet was enormously swollen. At the end of 2 hours, the swollen sheet was removed from the reaction mixture and washed in running cold water for ½ hour. The washed sheet was then dipped briefly in N/2 hydrochloric acid followed by 1 hour's washing in running cold water. The sheet was dried at about 25° C. for 16 hours and then further dried at 50° C. for 18 hours. The carbamylated sheet was found to contain 7.94 percent by weight of nitrogen. The sheet was impermeable to water, slightly yellow in color and somewhat brittle.

*Example 13.—Esterification with lauroyl chloride*

A sheet of insoluble coating such as described in Example 1, weighing 2.4 g., was placed in a 1-liter flask containing 200 cc. of anhydrous pyridine, and 6 g. of lauroyl chloride. The flask was tightly stoppered and stored at 70° C. for 4 hours. The sheet was removed from the reaction mixture, rinsed in fresh benzene, and dried at room temperature. The sheet was highly elastic, insoluble in all solvents and resisted the passage of water.

*Example 14.—Esterification with acetic anhydride*

The following mixture was placed in a large Petri dish and stored in an oven at 50° C. for 24 hours: 30 cc. of anhydrous pyridine, 100 cc. of acetic anhydride and a 3 g. sheet (6 inches x 6 inches and 0.005 inch thick) of insoluble material such as described in Example 1. The sheet was removed from the reaction mixture. It was clear. It was washed briefly in cold water, then in N/2 hydrochloric acid, then in cold water, then in 28 percent aqueous ammonia and finally in water. It was dried at 25° C. for 24 hours. The sheet was highly elastic, and exhibited a marked tendency to stiffen at temperatures much below that of 20° C., and became plastic, or at least more pliable, at temperatures above 40° C.

Not only the insoluble materials of our invention but the soluble materials from which they are formed can be treated with agents capable of reacting with hydroxyl groups. The following example shows the acetalization of one of the soluble materials.

*Example 15*

To 400 g. of a 4.81 percent solution of a de-esterified copolymer of vinyl acetate and β-chloroallyl acetate containing four percent of the latter, at a pH of 3.5, were added 20 g. of acetaldehyde. The mixture was cooled to 3° C. and after 1 hour's standing at this temperature, 5 cc. of concentrated hydrochloric acid were added. After 1 hour's additional standing, the solution had a gelling point of 19.5° to 20° C. A coating was made at 25° C. and allowed to stand for 16 hours. At the end of this time a clear sheet resulted which was insoluble in both hot and cold water as well as in the common organic solvents.

In removing the solvent from our new soluble materials to produce our new tough insoluble materials, large quantities of acid should not be present as colored insoluble materials tend to be formed under such circumstances. On the other hand, the pH of the system undergoing the change from solubility to insolubility is advantageously low, i. e. of the order of 3 or lower. The pH may be higher (say 6.5 or 7) at the beginning of the change, but should not be held at that point by buffering. Rather the pH should not be controlled and will ordinarily change to values of the order of 3 as the change from solubility to insolubility proceeds.

Water-soluble polymeric substances containing hydroxyl groups, such as polyvinyl alcohol, partially hydrolyzed polyvinyl esters and water-soluble cellulose esters, can be rendered water insoluble by means of our new polymeric materials. This can be accomplished by mixing aqueous solutions of the water soluble polymeric material and our new polymeric materials and then removing the solvent. The following examples will serve to illustrate.

*Example 16.—Insolubilization of polyvinyl alcohol*

20 g. of the solution obtained by deesterifying the copolymer of vinyl acetate and β-chloroallyl acetate as described in Example 1, containing 7.56 percent of solids, were mixed with 20 grams of an aqueous solution of high viscosity polyvinyl alcohol (containing 7.56 percent by weight of polyvinyl alcohol). The resulting mixture was coated on a glass plate. The coating was allowed to dry at about 25° C. After 15 hours, a clear, brilliant film resulted which was insoluble in boiling water. A control coating of an aqueous solution of polyvinyl alcohol gave a film which was readily soluble in boiling water.

*Example 17.—Insolubilization of polyvinyl alcohol*

100 g. of a copolymer of vinyl acetate and β-chloroallyl acetate, containing 5.23 percent by weight of the latter, were dissolved in 900 cc. of anhydrous methanol. The copolymer was then deesterified as in Example 1. 5 g. of the resulting solution of the deesterified copolymer, containing 5.61 percent by weight of the deesterified copolymer, were mixed with 20 g. of an aqueous solution (5.61 percent by weight) of high viscosity polyvinyl alcohol. The resulting mixture was coated on a glass plate and allowed to dry at about 25° C. After 15 hours, a clear, brilliant, film resulted which was insoluble in boiling water.

*Example 18.—Insolubilization of water-soluble cellulose acetate*

20 g. of a solution obtained by deesterifying the copolymer of vinyl acetate and β-chloroallyl acetate as described in Example 7, containing 5.61 percent by weight of polymer, were mixed with an aqueous dispersion (5.61 percent by weight) of cellulose acetate containing 18 percent by weight of acetyl. The resulting mixture was coated on a glass plate and the coating allowed to dry at about 25° C. After 39 hours, a somewhat hazy film had been deposited which was insoluble in boiling water. The control coating of cellulose acetate alone dissolved readily in water.

*Example 19.—Insolubilization of water-soluble cellulose hydroxyethyl ether*

11 g. of a solution obtained by deesterifying the copolymer of vinyl acetate and β-chloroallyl acetate as described in Example 1, containing 7.56 percent by weight of solids, were mixed with 9 g. of an aqueous solution (7.56% by weight) of hydroxyethyl ether of cellulose. The resulting mixture was coated on a glass plate and allowed to dry at about 25° C. After 63 hours, a somewhat hazy coating had formed which was insoluble in boiling water. A control coating of the hydroxyethyl ether of cellulose was easily soluble.

When aqueous solutions of our new water-soluble materials are coated on glass and the coatings permitted to dry and form insoluble sheets, we have found that the insoluble sheets adhere more strongly to the glass than do sheets of polyvinyl alcohol which are formed by coating aqueous solutions of polyvinyl alcohol.

What we claim as our invention and desire to be secured by Letters Patent of the United States is:

1. A water-soluble resinous material which, when the water of a water-solution of which is evaporated becomes insoluble in water, the water-soluble material having resulted from the deesterification, in solution in a monohydric saturated aliphatic alcohol containing not more than 3 carbon atoms and in the presence of an acid deesterification catalyst, of a copolymer of vinyl acetate and a mono β-chloroallyl ester of a monocarboxylic acid selected from the group consisting of benzoic acid and saturated aliphatic monocarboxylic acids containing not more than 3 carbon atoms, said copolymer containing from about 1 to about 14 per cent by weight of the mono β-chloroallyl ester, the deesterification having been continued until not more than a trace of chlorine is present in the resinous material.

2. A water-soluble resinous material which, when the water of a water-solution of which is evaporated becomes insoluble in water, the water-soluble material having resulted from the deesterification, in solution in a monohydric saturated aliphatic alcohol containing not more than 3 carbon atoms and in the presence of an acid deesterification catalyst, of a copolymer of vinyl acetate and β-chloroallyl acetate, said copolymer containing from about 1 to about 14 per cent by weight of the β-chloroallyl acetate, the deesterification having been continued until not more than a trace of chlorine is present in the resinous material.

3. A water-soluble resinous material which, when the water of a water-solution of which is evaporated becomes insoluble in water, the water-soluble material having resulted from the deesterification in solution in a monohydric saturated aliphatic alcohol containing not more than 3 carbon atoms and in the presence of an acid deesterification catalyst a copolymer of vinyl acetate and β-chloroallyl acetate, said copolymer containing about 3.1 per cent by weight of the β-chloroallyl acetate, the deesterification having been continued until not more than a trace of chlorine is present in the resinous material.

4. A water-soluble resinous material which, when the water of a water-solution of which is evaporated becomes insoluble in water, the water-soluble material having resulted from the deesterification, in solution in a monohydric saturated aliphatic alcohol containing not more than 3 carbon atoms and in the presence of an acid deesterification catalyst, of a copolymer of vinyl acetate and β-chloroallyl N-ethylcarbamate, said copolymer containing about 6.8 per cent by weight of the β-chloroallyl N-ethylcarbamate, the deesterification having been continued until not more than a trace of chlorine is present in the resinous material.

5. A water-soluble resinous material which, when the water of a water-solution of which is evaporated becomes insoluble in water, the water-soluble material having resulted from the deesterification, in solution in a monohydric saturated aliphatic alcohol containing not more than 3 carbon atoms and in the presence of an acid deesterification catalyst, of a copolymer of vinyl acetate and β-chloroallyl ethylcarbonate, said copolymer containing about 9.2 per cent by weight of the β-chloroallyl ethyl carbonate, the deesterification having been continued until not more than a trace of chlorine is present in the resinous material.

6. A process for preparing a water-soluble resinous material which, when the water of a water-solution of which is evaporated becomes insoluble in water, comprising deesterifying, in solution in a monohydric saturated aliphatic alcohol containing not more than 3 carbon atoms and in the presence of an acid deesterification catalyst, a copolymer of vinyl acetate and a mono β-chloroallyl ester of a monocarboxylic acid selected from the group consisting of benzoic acid and saturated aliphatic monocarboxylic acids containing not more than 3 carbon atoms, said copolymer containing from about 1 to about 14 per cent by weight of the mono β-chloroallyl ester, until a resinous material containing not more than a trace of chlorine is obtained.

7. A process for preparing a water-soluble resinous material which, when the water of a water-solution of which is evaporated becomes insoluble in water, comprising deesterifying, in solution in a monohydric saturated aliphatic alcohol containing not more than 3 carbon atoms and in the presence of an acid deesterification catalyst, a copolymer of vinyl acetate and β-chloroallyl acetate, said copolymer containing from about 0 to about 14 per cent by weight of the β-chloroallyl acetate, until a resinous material containing not more than a trace of chlorine is obtained.

8. A process for preparing a water-soluble resinous material which, when the water of a water-solution of which is evaporated becomes insoluble in water, comprising deesterifying, in solution in methanol and in the presence of a hydrogen chloride deesterification catalyst, a copolymer of vinyl acetate and β-chloroallyl acetate, said copolymer containing from about 1 to about 14 per cent by weight of the β-chloroallyl acetate, until a resinous material containing not more than a trace of chlorine is obtained.

9. A process for preparing a water-soluble resinous material which, when the water of a water-solution of which is evaporated becomes insoluble in water, comprising deesterifying, in solution in methanol and in the presence of a hydrogen chloride deesterification catalyst, a copolymer of vinyl acetate and β-chloroallyl acetate, said copolymer containing about 3.1 per cent by weight of the β-chloroallyl acetate, until a resinous material containing not more than a trace of chlorine is obtained.

10. A process for preparing a water-soluble resinous material which, when the water of a water-solution of which is evaporated becomes insoluble in water, comprising deesterifying, in solution in methanol and in the presence of a hydrogen chloride deesterification catalyst, a copolymer of vinyl acetate and β-chloroallyl N-ethyl carbamate, said copolymer containing about 6.8 per cent by weight of the β-chloroallyl N-ethyl carbamate, until a resinous material containing not more than a trace of chlorine is obtained.

11. A process for preparing a water-soluble resinous material which, when the water of a water-solution of which is evaporated becomes insoluble in water, comprising deesterifying, in solution in methanol and in the presence of a hydrogen chloride deesterification catalyst, a copolymer of vinyl acetate and β-chloroallyl ethyl carbonate, said copolymer containing about 9.2 per cent by weight of the β-chloroallyl ethyl carbonate, until a resinous material containing not more than a trace of chlorine is obtained.

WILLIAM O. KENYON.
WILLIAM F. FOWLER, Jr.